United States Patent [19]

Kawakami et al.

[11] Patent Number: 4,994,095
[45] Date of Patent: Feb. 19, 1991

[54] SEMIPERMEABLE MEMBRANES BASED ON SPECIFIC 4,4'-(1H-ALKYLIDENE)BIS[2,3,6-TRIALKYL-PHENOL]TYPE POLYESTERS

[75] Inventors: James H. Kawakami, Piscataway; Natarajan Muruganandam, Somerville; George L. Brode, Bridgewater, all of N.J.

[73] Assignee: Union Carbide Industrial Gases Technology Corporation, Danbury, Conn.

[21] Appl. No.: 443,208

[22] Filed: Dec. 6, 1989

Related U.S. Application Data

[63] Continuation-in-part of Ser. No. 358,631, May 30, 1989, abandoned, which is a continuation-in-part of Ser. No. 289,668, Dec. 27, 1988, abandoned.

[51] Int. Cl.$^5$ .............................................. B01D 71/48
[52] U.S. Cl. ................................ 55/16; 210/500.28; 210/490; 55/68
[58] Field of Search ..................... 55/16, 68, 158; 427/245, 246; 528/202; 210/500.28, 490

[56] References Cited

U.S. PATENT DOCUMENTS

| Re. 30,351 | 7/1980 | Hoehn et al. ........................... 55/16 |
| 3,388,097 | 6/1968 | Cramer et al. ........................ 260/47 |
| 3,822,202 | 7/1974 | Hoehn .................................. 210/23 |
| 3,899,309 | 8/1975 | Hoehn et al. ........................... 29/16 |
| 4,818,254 | 4/1989 | Anano et al. ....................... 55/68 X |
| 4,822,382 | 4/1989 | Nelson ................................. 55/16 |

FOREIGN PATENT DOCUMENTS

| 0242147 | 10/1987 | European Pat. Off. . |
| 0244126 | 11/1987 | European Pat. Off. . |
| 53-66880 | 6/1978 | Japan . |

OTHER PUBLICATIONS

L. A. Pilato et al., Polymers for Permselective Membrane Gas Separations, Amer. Chem. Soc. Div. Polym. Chem., Polym. Prepr., 16(2) (1975), 41–46.

*Primary Examiner*—Frank Spear
*Attorney, Agent, or Firm*—Alvin H. Fritschler

[57] ABSTRACT

Permeable membranes comprised predominantly of specifically defined polyester of 4,4'-(1H-alkylidene)-bis[2,3,6-trialkylphenol] and aromatic dicarboxylic acids. The invention also pertains to the novel permeation processes for recovery of an oxygen/nitrogen or carbon dioxide/methane or helium/methane component from a mixture of said component with other components in the mixture.

29 Claims, No Drawings

SEMIPERMEABLE MEMBRANES BASED ON SPECIFIC 4,4'-(1H-ALKYLIDENE)BIS[2,3,6-TRIALKYL-PHENOL]TYPE POLYESTERS

This application is a continuation-in-part of application Serial No. 358,631, filed May 30, 1989; which was a continuation-in-part of application Ser. No. 289,668, filed Dec. 27, 1988, both now abandoned.

FIELD OF THE INVENTION

This invention relates to semipermeable membranes of polyesters of 4,4'-(1H-alkylidene)-bis[2,3,6-trialkylphenol] and aromatic dicarboxylic acids as the predominant nuclei components of the polyester. The invention also relates to processes using said membranes for the selective permeation of at least one component from a fluid mixture containing said one component in admixture with other components, in particular for oxygen/nitrogen, and carbon dioxide/methane separations.

DESCRIPTION OF THE PRIOR ART

Permeable membranes capable of selectively permeating one component of a fluid mixture, either liquid or gas, are considered in the art as a convenient, potentially highly advantageous means for achieving fluid separations. For practical commercial operations, permeable membranes must be capable of achieving an acceptable level of selectivity or separation of the gases or liquids contained in the fluids feed stream while, at the same time, achieving a desirably high productivity, or rate, of component separation.

Various types of permeable, or semipermeable, membranes are known in the art for carrying out a variety of fluid separations. Such membranes have been classified as being of the isotropic, or homogeneous, or composite, or asymmetric types and their structures are well known to those skilled in this art.

As the advantages of permeable and semipermeable membranes have become increasingly appreciated, the performance requirements have likewise increased and the drive to find new membranes for more applications has continued to grow. These demands have resulted in the art moving in the direction of very thin membranes having desired permeability characteristics without sacrifice of the separation, or selectivity, characteristics of the membrane, or of the permeation rate, or productivity, of separation achievable.

At the current time permeable membranes are known that are made from a wide variety of materials, e.g. natural and synthetic polymers such as rubbers, polysiloxanes, polyamines, tetramethyl bisphenol-A polysulfone polymers, brominated polyphenylene oxide, cellulose acetate, ethyl cellulose, polyethylene, polypropylene, polybutadiene, polyisoprene, polystyrene, the polyvinyls, polyesters, polyimides, polyamides, the polycarbonates, and a host of other materials.

The following table shows the published diameters of a few of the various gases commonly separated with polymeric membranes.

| Gas | He | $H_2$ | $CO_2$ | $O_2$ | $N_2$ | $CH_4$ |
|---|---|---|---|---|---|---|
| Diameter (Angstrom) | 2.6 | 2.89 | 3.3 | 3.46 | 3.64 | 3.8 |

In the case of oxygen and nitrogen the size difference is rather small, therefore, most polymeric membranes used commercially to separate nitrogen from oxygen have molecular structures that impede the flow of the gases, e.g., such as oxygen, through the membrane. For that reason these polymeric membranes need to be extremely thin, generally about 200 to about 10,000 Angstroms thick, preferably less than 2,000 Angstroms, to make the separation economically viable. The thinner membrane allows faster transport of the permeate through the membrane.

Technology and physical factors limit how thin one can prepare the membrane film or the coating of a composite membrane, thus it would be advantageous to develop new membrane polymers which have higher permeation rates without greatly sacrificing or even improving their ability to separate the desired gas mixtures. However the large body of gas permeability coefficients and gas separation data in the literature (e.g., Polymer Handbook, 2nd ed. John Wiley & Sons, 1975) generally shows that increasing the permeability of gases, such as oxygen, by varying the polymer structure, decreases the latter's separation characteristics, the ability to separate oxygen from nitrogen. The data also shows that with the current state-of-the-art it is not really possible to predict gas permeation rates or gas selectivity even when rather minor changes are made in the chemical structure of the membrane of one polymer class, such as the polyesters or polycarbonates, even where certain structural features remain constant. The literature also indicates that variations in the membrane itself, be it isotropic, asymmetric or composite in structure, and its thickness can also have a marked effect on permeation rate and selectivity. The inference drawn from the literature is that the inclusion of a large number of arbitrary modifications to the basic polymer structure of one or more polymer classes in many membrane patents is not fully instructive in predicting the usefulness of the alternative structures that had not been studied. It would appear that careful consideration needs to be given to defining both the chemical and physical structures of membranes suitable for use in gas separation processes.

Many of the factors which influence gas permeability have been largely known for over two decades, but the ability to quantitatively predict the magnitude and even direction of a combination of these factors in a specific polymeric membrane has not been successful to this day. In the nineteen-fifties and nineteen-sixties researchers knew that the attractive forces between polymer chains, packing density, rotation around single bonds in the polymer chain, and the relative rigidity (aromatic structures) or flexibility (aliphatic structures) of the polymer chain affected gas permeability. Rigid highly aromatic polymer structures such as bisphenol-A polycarbonates were examined in the nineteen-sixties and early nineteen-seventies in attempts to obtain an optimum combination of gas permeability and gas separation or selectivity. For example, outstanding values of gas selectivity for oxygen/nitrogen were obtained, but this was not combined with sufficiently high gas permeability and the desire to attain higher gas permeability has continued.

A publication in Aug. 1975 by Pilato et al. (Amer. Chem. Soc. Div. Polym. Chem., Polym. Prepr., 16(2) (1975) 41–46) showed that it is possible to modify rigid aromatic polymer structures such as polysulfones, polycarbonates and polyesters, including certain bisphenolphthalate polyesters not within the scope of this invention, to increase the gas permeation rate without significant decreases in helium/methane and carbon dioxide/methane separations. More data by Pilato et al. show that the incorporation of tetraisopropyl bisphenol A or tetramethylbisphenol L (based on Limonene+-Dimethylphenol) in these polymers to try to increase the gas flux resulted in decreased gas selectivity. Therefore, even in the rigid polymer systems, it appears that the general trend noted in the Polymer Handbook holds; increasing the gas permeability results in reduced gas selectivity. Based on this work and the other publications, infra, it appears that additional effort was necessary to achieve higher gas permeability and still retain high gas selectivity.

Also in Aug. 1975 another unusually broad disclosure appeared, U.S. Pat. No. 3,899,309 (U.S. Re. No. 30,351, July 29, 1980), which described highly aromatic polyimides, polyamides and polyesters. The patent alleged the combination of main chain non-linearity, high aromatic structure and prevention of free rotation around main chain single bonds led to increased gas permeability. The disclosure is so broad that one is not adequately or fully instructed to enable a skilled person to determine which particular structure or structures would give the more desirable gas permeability and selectivity without extensive study and experimentation.

In U.S. Pat. Re. No. 30,351, filed May 18, 1976 by H. H. Hoehn et al. (reissued on July 29, 1980), which is the reissue of U.S. Pat. No. 3,899,309 (issued on Aug. 12, 1975) there are broadly disclosed separation membranes of aromatic polyimides, polyesters, and polyamides. The invention broadly described and claimed in these patents requires the polymer aromatic imide, aromatic ester, or aromatic amide repeating unit must meet certain requirements, namely:

(a) it contains at least one rigid divalent subunit, the two main chain single bonds extending from which are not colinear, (b) is sterically unable to rotate 360° around one or more of said main chain single bonds, and (c) more than 50% of the atoms in the main chain are members of aromatic rings.

These requirements are set forth in the reissue patent in the Abstract; at column 1, lines 40 to 53; in claim 1 and in all claims dependent upon claim 1. The manner in which requirement (a) is determined is set forth in column 2, lines 51 to 68; the determination of requirement (b) is described in column 3, lines 1 to 28; and the determination of requirement (c) is described in column 3, lines 29 to 56; with column 3, lines 57 to 68 explaining how the requirements were determined in the examples. Thus, for a polymer to be within the orbit of the invention described and claimed in Re. 30,351 it must meet all three criteria or requirements defined in the patent. Should it fail to meet all three requirements it cannot be considered a polymer falling within the orbit of the invention. Requirement (b) of U.S. Re. No. 30,351 restricts the membranes to those from polymers in which the polymer chain contains at least one rigid monolinear bond between rigid subunits around which subunit the polymer chain is sterically prevented from rotating 360° and specifically describes the manner in which this can be ascertained by the use of a clearly identified, readily available CPK molecular model kit. Thus, a polymer structure assembled from the identified kit which is not sterically prevented from rotating 360° cannot be considered as being within the scope of U.S. Re. No. 30,351.

U.S. Re. No. 30,351 defines the polyesters alleged to meet the requirements (a), (b), and (c) at column 2, lines 21 to 34; column 6, lines 26 to 56; column 7, lines 19 to 29 and 42 to 53 and column 11 line 62 to column 12, line 68 (Tables III and IV), with specific examples of polyesters and their membranes being shown in Examples 1-5, 9-12 and 22. The use of polyester membranes in the process is claimed in claims 1 and 8 to 13; with claims 12 and 13 being duplicates. The membranes of the invention are said to be in film form or hollow fiber form, column 4, lines 10 to 15 and lines 43 to 46 and it is stated they can be uniform membranes (column 4, lines 47 to 49) or asymmetric membranes (column 4, lines 49 to 54).

In U.S. Pat. No. 3,822,202, issued to H. H. Hoehn on July 2, 1974, the same polyimide, polyester and polyamide polymers are disclosed as suitable for use as membranes but in this patent the membranes are subjected to a heat treatment in an environment of air or an inert gas under vacuum at a temperature range of 150° C. up to just below the softening point of the polymer. This results in the formation of a true asymmetric membrane. In all of U.S. Pat. No. 3,822,202 there is no mention of composite membranes and the only example in U.S. Pat. No. 3,822,202 employing a polyester membrane is Example 21, which uses an air dried flat film 2.15 mils thick. It is to be noted that there is no specific disclosure in U.S. Pat. No. 3,822,202 of any membrane produced from a polyester of a 4,4'-(1 H-alkylidene)bis[2,3,6-trialkylphenol] and an aromatic dicarboxylic acid or the use thereof in a fluids separation process.

Most recently U.S. Pat. No. 4,822,382 issued to J. K. Nelson on Apr. 18, 1989. This patent discloses separation membranes, in particular composite membranes, having a separation layer comprised of one or more poly(tetramethyl) bisphenol A phthalates for use in separating a gas mixture. The patent does not disclose other polyesters within this class and the data in the examples show lower oxygen/nitrogen selectivity in air separations.

In European Patent Application No. 0 242 147, Published Oct. 21, 1987, Aneda et al. there are disclosed gas separation membranes based on polycarbonate polymers derived from bisphenols and their use in gas separation processes. The membranes are alleged to have particular application in separating oxygen from nitrogen, but they are not polyesters.

European Patent Application No. 0 244 146, published Nov. 4, 1987, Anand et al., disclosed membranes based on polyestercarbonate polymers in which the polymer backbone is a tetrabromo diphenolic residue, and the use of the polymers in gas separation processes, but they are not polyesters.

Both of these European Patent Applications are based on polycarbonate polymers containing the carbonate group:

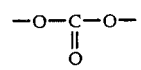

in the polymer chain. The presence of this carbonate link is an essential element of the inventions disclosed and is to be distinguished over the polyesters which contain the ester group:

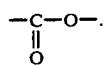

Japanese Unexamined Patent No. 53-66880, Published June 14, 1978, Shoji Ueno et al., discloses membranes based on aromatic polyesters produced from aromatic dicarboxylic acids and bisphenols of the structure:

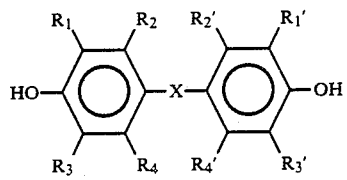

wherein
$R_{1-4}$ and $R'_{1-4}$ are hydrogen, halogen or hydrocarbon; and
X is either —O—, —SO$_2$—, —CO—, —S—, alkylene, or alkylidene.

All of the bisphenols disclosed and discussed as suitable contain one of the defined X groups as the linking or bridging group. The Japanese publication contains no disclosure or suggestion of any 4,4'-(1H-alkylidene)-bis[2,3,6-trialkylphenol]. There is no indication as to which polymers would be best suited for exceptional gas separation, nor does this patent suggest or recognize the exceptionally high oxygen/nitrogen separations unexpectedly achieved in the invention at this instant application.

SUMMARY OF THE INVENTION

This invention comprises an improved gas separation membrane consisting predominantly of a polyester or copolyester based on (1) at least 50 mole percent or more of a hexamethyl bisphenol acetal, also generally known as a 4,4'-(1H-alkylidene) bis[2,3,6-trialkylphenol] of the general formula:

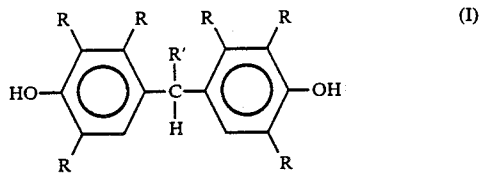

as hereinafter more fully defined, reacted with an aromatic dicarboxylic acid or its corresponding ester or acid chloride or salt, or the monobrominated derivatives thereof. This invention also comprises the use of said membrane in processes for the separation of oxygen from nitrogen.

DETAILED DESCRIPTION OF THE INVENTION

This invention provides novel improved polyester permeable membranes having exceptional oxygen/nitrogen gas separation properties with enhanced oxygen permeability.

The preparation of polyesters is well known and several procedures can be used. Thus, it is known that they can be produced by the catalytic reaction of a dihydroxyl compound with an aromatic dicarboxylic acid or an ester-forming derivative thereof such as an acid chloride. The method for producing the polyesters comprising the gas separation membranes of this invention is not a part of this invention and any polyesterification process can be used. A typical procedure employed for preparing the polyester membranes of this invention is the catalytic reaction of the hexamethyl bisphenol acetal compound 4,4'-(1H-ethylidene) bis[2,3,6-trimethylphenol] with terephthaloyl chloride, isophthaloyl chloride or mixtures thereof. Such a process is disclosed in U.S. Pat. No. 3,388,097, issued June 11, 1968 to Cramer et al. The phthaloyl compounds are used at a ratio of terephthaloyl to isophthaloyl compound of from 100:0 to 0:100, and can be from 85:15 to 15:85, or from 75:25 to 25:75, however, most preferably 100:0. In addition, as is known to those skilled in this art, a small amount of another suitable aromatic dicarboxylic acid, the halogen salt or the ester can be used in the polyesterification process; further, a small amount of the aromatic dicarboxylic acid component can be replaced with an aliphatic dicarboxylic acid; these small amounts added should be in quantities that do not have any significant deleterious effect on permeability and/or selectivity. Further, one can use mixtures of the 4,4'-(1H-alkylidene)bis[2,3,6-trialkylphenol] of Formula I with small amounts of other bisphenols or other aromatic and/or aliphatic diols with up to about 10 mole percent of 4,4'-(1H-alkylidene) bis[2,3,6-trialkylphenol] (I) being replaced by other bisphenols or such diols. The preferred polyesters are those produced by the condensation polymerization of the 4,4'-(1H-alkylidene) bis[2,3,6-trialkylphenol] of Formula I with terephthalic acid or of the salts or esters thereof. The Encyclopedia of Polymer Science & Technology, Mark et al. Editors, John Wiley and Sons, Interscience Division, N.Y., N.Y., publishers, 1969, Volume 11, pp. 1 to 168, contains a description of the many processes known for the preparation of polyesters. In view of the extensive knowledge of these polymers, there is no need for any detailed description of the specific reactants that have been described above nor of the reaction conditions required for the polyesterification reaction. This technical material is well known to those of ordinary skill in the polyester art.

The gas separation membranes of this invention comprise a thin layer consisting predominantly of a polyester or copolyester derived from a hexaalkylbisphenol of the general formula:

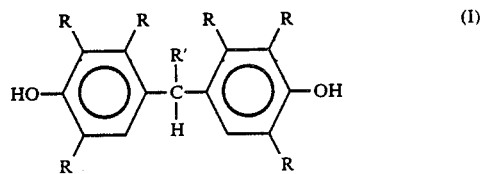

wherein R is an alkyl group having from 1 to about 3 carbon atoms, preferably methyl and R' is an alkyl group having from 1 to about 4 carbon atoms, preferably methyl.

The catalytic reaction of phenols with dialkyl acetals is well known to the skilled chemist. The 4,4'-(1H-alkylidene) bis[2,3,6-trialkylphenols] (I) are produced by the catalytic reaction of a trialkylphenol of the formula:

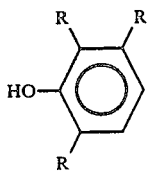

with a dialkyl acetal of the formula:

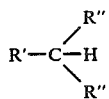

wherein R and R' are as previously defined and R" is alkyl of from 1 to about 5 carbon atoms, or more, preferably 2 carbon atoms. Thus, the reaction of 2,3,6-trimethylphenol with diethyl acetal produces 4,4'-(1H-ethylidene)bis[2,3,6-trimethylphenol] of the formula:

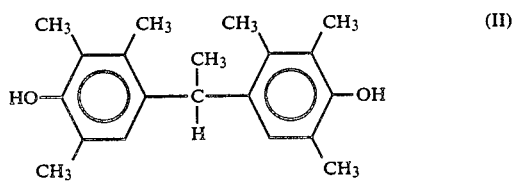

The 4,4'-(1H-alkylidene)bis[2,3,6-trialkylphenol] (I) used in producing the polyester gas separation permeable membranes make up at least 50 mole percent or more of the dihydroxyl compound used to produce the polyesters, preferably 100 mole percent. The polyesters or copolyesters are the reaction products of said compound (I) and isophthaloyl dichloride and terephthaloyl dichloride.

The polyester gas separation membranes of this invention contain as the predominant recurring unit the group having the structural formula:

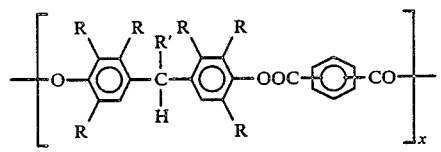

wherein x is an integer having a value of at least about 20 up to about 200 or more, preferably from about 50 to about 150. The polyester preferably has a weight average molecular weight of from about 40,000 to about 125,000.

Most published examples of membrane structures with high oxygen/nitrogen gas selectivity above 6 Barrers involve tetrahalogen substituted bisphenol structures, such as those reported in European Patent Application No. 0 242 147 and European Patent Application 0 244 146, supra. It has now been found that hexamethyl bisphenol acetals free of halogen atoms, such as 4,4'-(1H-ethylidene)-bis[2,3,6-trimethylphenol], based polyesters have unexpected and unpredictable unsually good oxygen/nitrogen separations simultaneously combined with oxygen permeability substantially higher than the values reported in the above European applications. For example, membranes produced with the polyester of 4,4'-(1H-ethylidene)-bis[2,3,6-trimethylphenol] reacted with terephthaloyl dichloride had an oxygen/nitrogen separation factor of 6.7 and an oxygen permeability of 3.46 Barrers. By comparison the membranes of EPA No. 0 242 147 reported an oxygen/nitrogen separation factor of 7.4 and an oxygen permeability of only 0.8 Barrer and the membrane of EPA No. 0 244 126 reported an oxygen/nitrogen separation factor of 7.2 and an oxygen permeability of only 1.23 Barrers. The combination of high values for both the oxygen/nitrogen selectivity and substantially higher permeation rate for the polyesters of this invention is an unexpected and unpredictable contribution to the art.

In addition, the polyesters of this invention offer a further valuable contribution to membrane gas separation technology, these polyesters have adequate solubility in less polar solvents than are reportedly used for the highly halogenated bisphenol based polymers. Thus, composite membranes can be made more readily with such solvent mixtures having a very thin coating layer on the porous support without any significant deleterious affect to the support. There is less likelihood of stress crack problems or destruction of the porous hollow fiber substrate based an amorphous polymers, such as the polysulfones.

In some instances even higher selectivity may be desirable for composite membranes, even with some sacrifice in oxygen permeability. A minor change in the structure of the polyesters of this invention, the substitution of one bromine atom on the terephthalic acid and/or isophthalic acid compound used to produce the polyester, yielded a significantly higher oxygen/nitrogen selectivity. The higher selectivity and permeability obtained with monobromo substituted isophthalic acid and/or terephthalic acid and 4,4'-(1H-alkylidene)bis-[2,3,6-trialkylphenol] polyesters are not substantially different from those reported in the literature, but their solubility in less polar solvents for coating of porous hollow fiber substrates such as polysulfone makes them valuable. The preferred structure is the polyester of 4-bromoisophthalic acid and 4,4'-(1H-ethylidene)-bis[2,3,6-trimethylphenol].

The gas separation membrane of this invention can be of dense film or of any form known to those skilled in the art. Further, it can be a composite membrane, an asymmetric membrane, or a homogeneous membrane or isotropic membrane. The membranes may be in spiral form, flat sheet, tubular form, or other configurations, as well as in hollow fiber form. Those skilled in the art are aware of the many methods available for their production and know how to prepare the membranes in any of these forms. The preferred membranes of this invention are the asymmetric or composite membranes, with separation layers less than 10,000 Angstroms thick preferably less than 5,000 Angstroms thick, most preferably from about 200 to about 2,000 Angstroms thick.

The isotropic and asymmetric type membranes are generally comprised essentially of a single permeable membrane material capable of selective oxygen/nitrogen and carbon dioxide/methane separations. Asymmetric membranes are distinguished by the existence of two or more morphological regions within the membrane structure; one such region comprising a thin relatively dense semipermeable skin capable of selectively permeating at least one component from the gas mixture containing said at least one component in admixture with other components, and the other region comprising a less dense, porous, essentially non-selective support region that serves to preclude the collapse of the thin skin region of the membrane during use. Composite membranes generally comprise a thin layer or coating of the polyester semipermeable membrane material superimposed on a Porous substrate.

Flat sheet membranes are readily prepared from polyester solutions in a suitable solvent, e.g. methylene chloride, by casting the solution and evaporating the solvent, and thereafter drying and curing the cast film under vacuum at elevated temperature. Such thin film membranes can vary in thickness from about 0.5 mil to about 10 mils or more, preferably from about 1 mil to about 3 mils.

Flat sheet membranes are generally not the preferred commercial form. In large scale commercial applications hollow fiber permeable membranes are generally more desirable because they provide a significantly larger surface area per volume unit when fabricated as modules. The porous hollow fiber permeable membranes comprise a porous hollow fiber support having a permeable membrane layer on the surface thereof. The methods for their production are well known (See for example, "Hollow Fibers Manufacture and Applications", ed. J. Scott, Noyes Data Corporation, N.J., 1981, p. 264 et seq.)

The 4,4'-(1H-alkylidene)bis[2,3,6-trialkylphenol] type polyester permeable separation membranes of this invention exhibit a high separation factor for oxygen over nitrogen from air mixtures of at least about 6.5 coupled with a permeability rate or flux of at least about 1.7. The ability of these membranes to separate these components with such high combination of both separation factor and permeability rate was completely unexpected and is superior to the results often exhibited by many existing membranes in the art.

The reduced viscosities of the polyesters were determined at 25° C. using a polymer solution containing 0.200 g of polymer per 100 ml of chloroform and calculated by the equation $$RV = \frac{A - B}{(C)(B)}$$

wherein A is the time it takes the sample of chloroform solution to travel through the viscometer, B is the time it takes chloroform to travel through the viscometer and C is the weight of the sample of chloroform solution.

The polyesters were film forming at a reduced viscosity in chloroform of about 0.25 and above. For gas permeable processes the polyester having viscosities of about 0.25 or higher provide adequately strong films of about 2 mils to about 5 mils thick; preferred viscosities are from about 0.25 to about 1.6, most preferably from about 0.45 to about 1.3. The film thickness can vary from about 1 mil to about 10 mils, preferably from about 2 mils to about 5 mils.

Porous hollow fiber polysulfone substrates are particularly useful in the preparation of composite membranes. Porous polysulfone hollow fibers are produced from solutions of the polysulfone in a solvent/non-solvent mixture, as is known in the art, using essentially the procedure described by I. Cabasso et al. in "Composite Hollow Fiber Membrane", Journal of Applied Polymer Science, 23, 1509-1523 and in "Research and Development of NS-1 and Related Polysulfone Hollow Fibers For Reverse Osmosis Desalination of Seawater" PB 248,666, prepared for the Office of Water Research and Technology, Contract No. 14-30-3165, U.S. Department of the Interior, July 1975. The well known tube-in-tube jet technique was used for the spinning procedure, with water at about room temperature being the outside quench medium for the fibers. The quench medium in the center bore of the fiber was air. Quenching was followed by extensive washing to remove pore forming material. Following the wash, the hollow fibers were dried at elevated temperature by passage through a hot air drying oven.

Advantageously, the walls of the porous polysulfone hollow fibers are sufficiently thick so that no special apparatus would be required for their handling and they can be conveniently formed into cartridges. The outside diameter of the porous polysulfone hollow fiber can vary from about 1 mil or less to about 100 mils or more, preferably from about 2 mils to about 80 mils. The wall thickness of the porous polysulfone hollow fiber can vary from about 0.1 mil to about 25 mils or more, preferably at least about 0.2 mil up to about 20 mils. The spun polysulfone fibers are generally considered to be substantially isotropic, however, some degree of asymmetry is usually present. Porosity of hollow fibers can be modified, by annealing techniques, particularly by heat annealing. This is conventionally performed by passing the dried porous polysulfone hollow fiber through a hot air oven at a temperature of from about 160° C. up to close to the glass transition temperature of the polysulfone (195°-200° C.) for a period of less than about 30 seconds, preferably not more than about 10 seconds.

The gas permeability or permeation rate P measurements of the flat film membranes evaluated in the following examples were determined at 25° C. by placing a small disc of the polymer membrane film of known thickness in a constant volume—variable pressure permeation cell. Both sides of the membrane were degassed under vacuum overnight and one side of the membrane was then exposed to the gas at 25 psig. The permeate gas was collected in a reservoir on the other side of the membrane and the gas pressure was measured using a sensitive transducer. The pressure build-up as a function of time was recorded on a strip chart and the data was used to determine the steady state permeation rate P.

The permeability rate P is reported in Barrer units, a Barrer unit being:

$(cm^3(STP) \, cm/cm^2 - sec. \, cm \, Hg) \times 10^{-10}$

The membranes were prepared from 2 to 10 weight percent polymer solutions in methylene chloride and were from about 2 to about 10 mils thick. The solvent was removed under vacuum at 40° C. for about 24 hours and finally at 125° C. for 5 days before evaluation.

Experiment 1 shows the preparation of 4,4'-(1H-ethylidene)bis[2,3,6-trimethylphenol] used for producing polyester membranes used in the examples of this invention. The structure of the compound was confirmed by both proton and C-13 nuclear magnetic resonance analysis.

EXPERIMENT 1

Compound I of this experiment was prepared from 2,3,6-trimethylphenol and diethyl acetal.

To a 2 liter 3 necked round bottom flask equipped with a mechanical stirrer, hydrogen chloride gas sparge tube, thermometer, reflux condenser, and 10% sodium hydroxide trap there were added 544.76 grams 2,3,6-trimethylphenol, 118.18 grams diethyl acetal, 40 ml ortho-dichlorobenzene, and 7.2 ml n-octyl mercaptan. The mixture was heated to 40° C. and hydrogen chloride from a lecture bottle was added at such a rate to maintain a saturated solution of hydrogen chloride. After 4 hours the reaction mixture was cooled and diluted with 450 ml cyclohexane and stirred to break-up the solid product. The product was filtered and washed 3 times with 400 ml portion of cyclohexane and dried at 80° C. in a vacuum oven. The yield was 224.5 grams of 4,4'-(1 H-ethylidene)bis[2,3,6-trimethylphenol] (Compound I) (HMBAc). Recrystallization from methanol/water gave a 60% overall yield. The mp=168.5–170.0° C.

The following examples serve to further illustrate the invention. In the examples the aromatic dicarboxylic acid derivatives used were terephthaloyl chloride and isophthaloyl chloride or mixtures thereof, unless otherwise stated. Parts are by weight unless otherwise indicated.

The Polyesters were prepared by known interfacial polymerization procedures in a Waring Blender and in a three-necked round bottom flask with mechanical stirring and cooling with an ice bath. The stir rate was not always monitored, but it was generally about 1000 rpm. The rate of addition of the acid chloride was based on the control of the exotherm. As is well known in the literation ("Condensation Polymers by Interfacial and Solution Methods", Chapter VII, Paul W. Morgan, Interscience Publishers, 1965.), if everything else is constant, the molecular weight is higher the faster the acid chlorides are added to the reaction mixture. Also faster stir rates are significantly helpful and the use of a Morton flask appeared to help obtain higher molecular weights.

The permeability values (P in Barrers) and the oxygen/nitrogen selectivity and the helium/nitrogen selectivity values for the polyesters of this invention and of comparative data from the literature as derived by the instant inventors are summarized in TABLE 1.

EXAMPLE 1

A. Preparation of Polyarylate from HMBAc (Compound I) and 100% Brominated Isophthaloyl Chloride.

To a 3-necked 500 ml round bottom flask equipped with a mechanical stirrer, thermometer, addition funnel, nitrogen inlet and condenser, there were added 23.87 gms of compound I, 0.8 gm tetrabutyl ammonium hydrogen sulfate, 20.49 gms of 45.9% aqueous potassium hydroxide solution, 80 ml of distilled water, and 80 ml of methylene chloride. With ice water cooling a solution of 22.55 gms of 4-bromoisophthaloyl dichloride in 160 ml of methylene chloride was added in about 15 minutes with very fast stirring. After stirring for about 2 hrs., 100 ml of methylene chloride was added and the mixture acidified by adding 0.5% sulfuric acid. The polymer solution was washed three times with 1000 ml of distilled water. The polymer was coagulated in methanol and dried in a vacuum oven at 80° C. overnight. The yield was 36.6 gms of polyester. The reduced viscosity was 0.58.

B. A gas permeable flat membrane having a thickness of 3.59 mils was prepared and evaluated for separation of oxygen, nitrogen, carbon dioxide methane and helium at 25 psig.

The oxygen $P \times 1.93$ ($\times 10^{-10} cm^3$ (STP)–$cm/cm^2.sec.cm$ Hg)(Barrers). The oxygen/nitrogen selectivity was 7.1.

The carbon dioxide P=7.3 Barrers and the carbon dioxide/methane selectivity at 35 psig using pure gases was 41.

The helium P=27 Barrers and the helium/methane selectivity is 152.

EXAMPLE 2

Preparation of Polyarylate from HMBAc (Compound I) using a 50/50 Mixture of the Brominated Iso- and the Brominated Terephthaloyl Chlorides A. Essentially the same procedure as in Example 1 was followed for the synthesis, but for a change in the quantities of reagents. 11.28 gms 4-bromoisophthaloyl chloride and 11.28 gms, 2-bromoterephthaloyl chloride were used. The yield of polyester was 37.4 gms; the reduced viscosity was 0.97.

B. A gas permeable flat membrane having a thickness of 3.64 mils was prepared and evaluated for the permeation of oxygen, nitrogen, carbon dioxide, methane and helium as in Example 1.

The oxygen P=1.68 (Barrers). The oxygen/nitrogen selectivity was 7.3.

The carbon dioxide P=5.7 (Barrers) and the carbon dioxide/methane selectivity was 32 using mixed gases (50/50 composition) at 170 psia pressure.

The helium P=23 Barrers and the helium/methane selectivity was 128.

EXAMPLE 3

Preparation of Polyarylate from HMBAc (Compound I) using 100% 2-Bromoterephthaloyl Chloride A. Essentially the same procedure as in Example 1 was followed the only difference was that 22.25 gms of 2-bromoterephthaloyl chloride was used for this reaction. The yield of polymer was 37 gms; the reduced viscosity was 0.91.

B. A gas permeable flat membrane having a thickness of 1.71 mils was prepared and evaluated for the permeation of oxygen, nitrogen, carbon dioxide, methane and helium as in Example 1.

The oxygen P=1.06 Barrers and oxygen/nitrogen selectivity was 7.3.

The carbon dioxide P=4.0 Barrers and carbon dioxide/methane selectivity was 37 using pure gases at 35 psig.

The helium P=18 Barrers and helium/methane selectivity was 170.

EXAMPLE 4

A. Preparation of Polyarylate from HMBAc (Compound I) and 100% Isophthaloyl Chloride.

To a 3-necked 500 ml round bottom flask equipped with a mechanical stirrer, thermometer, addition funnel, nitrogen inlet and condenser, there were added 11.94 gms of Compound I, 0.4 gm of tetrabutyl ammonium hydrogen sulfate, 10.25 gms of 45.9% aqueous potassium hydroxide solution, 40 ml of distilled water and 40 ml of methylene chloride. With ice water cooling, a solution of 8.125 gms of isophthaloyl chloride in 80 ml of methylene chloride was added in about 15 minutes with very fast stirring. After stirring for about 2 hrs., 75 ml of methylene chloride was added and the mixture acidified by adding 0.5% sulfuric acid. The polymer solution was washed three times with 1000 ml of distilled water. The polymer was coagulated in methanol and dried in a vacuum oven at 80° C. overnight. The yield was 16.5 gms of polyester the reduced viscosity was 1.03.

B. A gas permeable flat membrane having a thickness of 1.47 mils was prepared and evaluated for separation of oxygen, nitrogen, carbon dioxide, methane and helium as in Example 1.

The oxygen P=2.64 Barrers and the oxygen/nitrogen selectivity was 6.6

The carbon dioxide P=10.5 Barrers and the carbon dioxide/methane selectivity was 39 using pure gases at 35 psig.

The helium P=34 Barrers and the helium/methane selectivity was 126.

EXAMPLE 5

A. Preparation Polyarylate from HMBAc (Compound I) and 100% Terephthaloyl Chloride.

Synthesis procedure was essentially the same as in Example 4 but for one difference. Here 8.125 gms of terephthaloyl chloride was used in the reaction. The yield of the polyester was 15.5 gm and the reduced viscosity was 1.87.

B. A gas permeable flat membrane having a thickness of 1.42 mils was prepared and evaluated for separation of oxygen, nitrogen, carbon dioxide, methane and helium as in Example 1.

The oxygen P=3.46 Barrers and the oxygen/nitrogen selectivity was 6.7.

The carbon dioxide P=14.4 Barrers and the carbon dioxide/methane selectivity was 48 using pure gases at 35 psig.

The helium P=39 Barrers and the helium/methane selectivity was 131.

EXAMPLE 6

Preparation of Polyarylate from 4,4'[1H-ethylidene]-bis[2,3,6-trimethylphenol] (Compound I) (HMBAc) and 75/25 Tere-/isophthaloyl Chloride Mixture.

Following the procedure described in Example 1, a polyester was produced from 12.57 grams of Compound I, 6.09 grams of terepthaloyl chloride and 2.03 grams of isophthaloyl chloride. The yield of polyester was 16.4 grams; the reduced viscosity was 1.13.

B. Following the procedure described in Example 1 a gas permeable flat membrane 4.3 mils thick was evaluated. A combination of high values for both the permeability rate and the selectivity for oxygen-nitrogen separations was not found to exist in the gas separation processes.

The oxygen P=3.8 Barrers. The oxygen/nitrogen selectivity was 6.26.

The carbon dioxide P=14.3 Barrers.

The helium P=39 Barrers and the helium/ nitrogen selectivity was 65.

The permeability values (P in Barrers) for oxygen, carbon dioxide and helium, and the oxygen/nitrogen, carbon dioxide/methane and helium/methane selectivity values of the membranes of this invention derived by the inventors as compared to data from the literature are summarized in Table 1. Notice the higher combination of both selectivity and permeation obtained by the materials and processes of this invention for the oxygen/nitrogen separations when compared to the values reported in the literature.

TABLE 1

| Ex. | P (Barrers) $O_2$ | $CO_2$ | He | Selectivity $O_2/N_2$ | $CO_2/CH_4$ | $He/CH_4$ |
|---|---|---|---|---|---|---|
| 1 | 1.93 | 7.3 | 27 | 7.1 | 41 | 152 |
| 2 | 1.68 | 5.7 | 23 | 7.3 | 32 | 128 |
| 3 | 1.06 | 4 | 18 | 7.3 | 37 | 170 |
| 4 | 2.64 | 10.5 | 34 | 6.6 | 39 | 126 |
| 5 | 3.46 | 14.4 | 39 | 6.7 | 48 | 131 |
| 6 | 3.8 | 14.3 | 39 | 6.26 | — | 65 |
| Ex 1(EPA-7) | 0.8 | — | — | 7.4 | — | — |
| Ex 6(EPA-7) | 3.9 | — | — | 5 | — | — |
| Ex 4(EPA-6) | 1.23 | — | — | 7.2 | — | — |
| Ex 2(EPA-7) | 1.45 | — | — | 6.3 | — | — |
| Ex 6(EPA-7) | 3.9 | — | — | 5 | — | — |
| UDEL PS | 1.2 | — | — | 5.9 | — | — |
| CA | 1 | — | — | 5.5 | — | — |

EPA-6 = EPO Application No. 0 244 126
EPA-6 = EPO Application No. 0 242 147
UDEL PS = UDEL Polysulfone (commercial membrane)
CA = Cellulose Acetate (commercial membrane)

What is claimed is:

1. A gas separation membrane comprising a thin layer consisting predominantly of a polyester or copolyester derived essentially from the reaction of an aromatic dicarboxylic acid or derivative thereof and a 4,4'-(1H-alkylidene)bis[2,3,6-trialkylphenol] of the general formula:

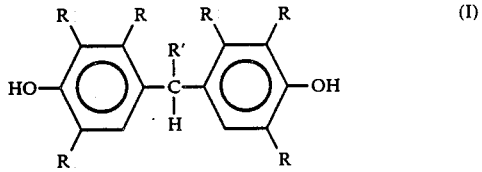

wherein R is an alkyl group having from 1 to about 3 carbon atoms and R' is an alkyl group having from 1 to about 4 carbon atoms; said membrane having a combination of high selectivity and high permeation rate values for $O_2/N_2$, $CO_2/CH_4$ and $He/CH_4$ separations.

2. A gas separation membrane as claimed in claim 1 wherein R and R' are methyl.

3. A gas separation membrane as claimed in claim 1 wherein said aromatic dicarboxylic acid comprises isophthalic acid or derivative thereof, terephthalic acid or derivative thereof, or mixtures thereof.

4. A gas separation membrane as claimed in claim 2 wherein said aromatic dicarboxylic acid comprises isophthalic acid or derivative thereof, terephthalic acid or derivative thereof, or mixtures thereof.

5. A gas separation membrane as claimed in claim 2 wherein said aromatic dicarboxylic acid is terephthalic acid.

6. A gas separation membrane as claimed in claim 2 wherein said aromatic dicarboxylic acid is isophthalic acid.

7. A gas separation membrane as claimed in claim 2 wherein said aromatic carboxylic acid is 4-bromoisophthalic acid.

8. A gas separation membrane as claimed in claim 2 wherein said aromatic dicarboxylic acid is 2-bromoterephthalic acid.

9. A gas separation membrane as claimed in claim 2 wherein said aromatic dicarboxylic acid is a mixture of 4-bromoisophthalic acid and 2-bromoterephthalic acid.

10. A gas separation membrane as claimed in claim 2 wherein said aromatic dicarboxylic acid is a mixture.

11. A gas separation membrane as claimed in claim 2 wherein said aromatic dicarboxylic acid is a mixture of (i) isophthalic acid or derivative thereof and (ii) 4-bromoisophthalic acid or 2-bromoterephthalic acid or mixture thereof.

12. A gas separation membrane as claimed in claim 2 wherein said aromatic dicarboxylic acid is a mixture of (i) terephthalic acid or derivative thereof and (ii) 4-bromoisophthalic acid or 2-bromoterephthalic acid or mixture thereof.

13. A process for separating a component from an $O_2/N$, $CO_2/CH_4$ or $He/CH_4$ gas mixture containing said component which comprises contacting said gas mixture with one side of a gas separation membrane comprising a thin layer consisting predominantly of a polyester or copolyester derived from the reaction of a 4,4'-(1H-alkylidene) bis[2,3,6-trialkylphenol] of the general formula:

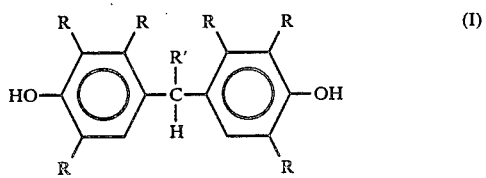

wherein R is an alkyl group having from 1 to about 3 carbon atoms and R' is an alkyl group having from 1 to about 4 carbon atoms, and an aromatic dicarboxylic acid or derivative thereof; said membrane having a combination of high selectivity and high permeation rate values, while maintaining a pressure differential across the two sides of the membrane and removing the permeated component from the other side of the membrane.

14. A process as claimed in claim 13 wherein R and R' are methyl.

15. A process as claimed in claim 14 wherein said gas mixture comprises oxygen and nitrogen.

16. A process as claimed in claim 14 wherein said gas mixture comprises air.

17. A process as claimed in claim 14 wherein said gas mixture comprises carbon dioxide and methane.

18. A process as claimed in claim 14 wherein said gas mixture comprises helium and methane.

19. A process as claimed in claim 13 wherein said aromatic dicarboxylic acid comprises isophthalic acid or derivative thereof, terephthalic acid or derivative thereof, or mixtures thereof.

20. A process as claimed in claim 14 wherein said aromatic dicarboxylic acid comprises isophthalic acid or derivative thereof, terephthalic acid or derivative thereof, or mixtures thereof.

21. A process as claimed in claim 14 wherein said aromatic dicarboxylic acid is terephthalic acid.

22. A process as claimed in claim 14 wherein said aromatic dicarboxylic acid is isophthalic acid.

23. A process as claimed in claim 14 wherein said aromatic dicarboxylic acid is 4-bromoisophthalic acid.

24. A process as claimed in claim 14 wherein said aromatic dicarboxylic acid is 2-bromoterephthalic acid.

25. A process as claimed in claim 14 wherein said aromatic dicarboxylic acid is a mixture of 4-bromoisophthalic acid and 2-bromoterephthalic acid.

26. A process as claimed in claim 14 wherein said aromatic dicarboxylic acid is a mixture of (i) isophthalic acid or derivative thereof and (ii) 4-bromoisophthalic acid or 2-bromoterephthalic acid or mixture thereof.

27. A process as claimed in claim 14 wherein said aromatic dicarboxylic acid is a mixture of (i) terephthalic acid or derivative thereof and (ii) 4-bromoisophthalic acid or 2-bromoterephthalic acid or mixture thereof.

28. A polyester gas separation membrane as claimed in claim 1 wherein the predominant recurring unit of said polyester has the structural formula:

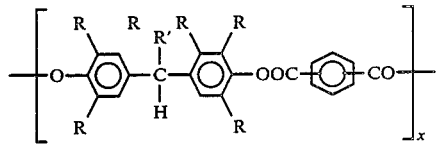

wherein R and R' are as defined in claim 1 and x is an integer having a value of at least about 20.

29. A process as claimed in claim 13 wherein the predominant recurring unit of said polyester has the structural formula:

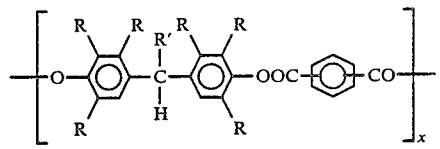

wherein R and R' are as defined in claim 13 and x is an integer having a value of at least about 20.

* * * * *